US008170102B2

(12) United States Patent
Bhaskaran et al.

(10) Patent No.: US 8,170,102 B2
(45) Date of Patent: May 1, 2012

(54) MACROBLOCK HOMOGENEITY ANALYSIS AND INTER MODE PREDICTION

(75) Inventors: Vasudev Bhaskaran, Sunnyvale, CA (US); Norihisa Hagiwara, Suwa (JP); William Chen, Foster City, CA (US); Changick Kim, Yuseong-gu (KR)

(73) Assignee: Seiko Epson Corporation, Tokyo (JP)

( * ) Notice: Subject to any disclaimer, the term of this patent is extended or adjusted under 35 U.S.C. 154(b) by 1898 days.

(21) Appl. No.: 11/305,927

(22) Filed: Dec. 19, 2005

(65) Prior Publication Data
US 2007/0140338 A1 Jun. 21, 2007

(51) Int. Cl.
H04N 3/24 (2006.01)
H04B 7/12 (2006.01)
H04B 3/46 (2006.01)
H03H 7/30 (2006.01)

(52) U.S. Cl. .............. 375/240.13; 375/225; 375/232
(58) Field of Classification Search ........... 375/240, 375/240.1; 358/240
See application file for complete search history.

(56) References Cited

U.S. PATENT DOCUMENTS

| | | | | |
|---|---|---|---|---|
| 5,214,507 A * | 5/1993 | Aravind et al. | ............ | 348/390.1 |
| 5,576,766 A * | 11/1996 | Matsumoto et al. | ..... | 375/240.02 |
| 6,256,343 B1 * | 7/2001 | Suzuki | ............ | 375/240 |
| 6,526,096 B2 | 2/2003 | Lainema et al. | | |
| 6,646,578 B1 | 11/2003 | Au | | |
| 6,674,911 B1 | 1/2004 | Pearlman et al. | | |
| 6,711,212 B1 | 3/2004 | Lin | | |
| 6,714,324 B1 * | 3/2004 | Kurosawa et al. | ............ | 358/487 |
| 6,728,315 B2 | 4/2004 | Haskell et al. | | |
| 6,757,330 B1 | 6/2004 | Hsu | | |
| 6,763,068 B2 | 7/2004 | Oktem | | |
| 6,785,333 B2 | 8/2004 | Yoo | | |
| 6,795,584 B2 | 9/2004 | Karczewicz et al. | | |
| 6,798,977 B2 | 9/2004 | Maeda | | |
| 7,474,699 B2 * | 1/2009 | Kobayashi et al. | ...... | 375/240.16 |
| 2002/0110194 A1 | 8/2002 | Bottreau | | |
| 2003/0058949 A1 | 3/2003 | MacInnis et al. | | |
| 2003/0112873 A1 | 6/2003 | Demos | | |
| 2003/0202607 A1 | 10/2003 | Srinivasan | | |
| 2004/0001546 A1 | 1/2004 | Tourapis et al. | | |
| 2004/0013199 A1 | 1/2004 | Winger et al. | | |
| 2004/0028131 A1 | 2/2004 | Ye et al. | | |
| 2004/0057624 A1 | 3/2004 | Wells | | |

(Continued)

FOREIGN PATENT DOCUMENTS

WO    WO 02/071741    9/2002

(Continued)

OTHER PUBLICATIONS

Chen, et al., "Efficient Block Size Selection for MPEG-2 to H.264 Transcoding", pp. 300-303, 2004.
Sullivan, G., et al., "Video Compression—From Concepts to the H.264/AVC Standard", Proceedings of the *IEEE*, vol. 93, No. 1, Dec. 2004, pp. 18-31.

(Continued)

*Primary Examiner* — King Poon
*Assistant Examiner* — Akwasi M Sarpong

(57) ABSTRACT

An inter mode for encoding a video macroblock is selected. An initial analysis on the macroblock homogeneity is performed to quickly reduce the number of inter modes for which motion estimation and rate distortion calculation are to be performed. An inter mode is selected based on these calculations and sub-pixel motion estimation, at various sub-pixel interpolation granularities, is performed only on the selected inter mode. Sub-pixel motion estimation may be skipped for macroblocks that exhibit relatively low distortion at the integer pixel level.

10 Claims, 9 Drawing Sheets

U.S. PATENT DOCUMENTS

| | | | |
|---|---|---|---|
| 2004/0062307 A1 | 4/2004 | Hallapuro et al. | |
| 2004/0131121 A1 | 7/2004 | Dumitras et al. | |
| 2004/0170333 A1 | 9/2004 | Toivonen et al. | |
| 2004/0170395 A1 | 9/2004 | Filippini et al. | |
| 2004/0190616 A1 | 9/2004 | Linzer et al. | |
| 2004/0233989 A1* | 11/2004 | Kobayashi et al. | 375/240.16 |
| 2004/0233993 A1 | 11/2004 | Johansen et al. | |
| 2004/0240549 A1 | 12/2004 | Cote et al. | |
| 2004/0252760 A1 | 12/2004 | Winger | |
| 2004/0252768 A1 | 12/2004 | Suzuki et al. | |
| 2004/0252901 A1 | 12/2004 | Klein Gunnewiek et al. | |
| 2005/0025249 A1 | 2/2005 | Zhao et al. | |
| 2005/0276331 A1* | 12/2005 | Lee et al. | |
| 2006/0193385 A1* | 8/2006 | Yin et al. | 375/240.12 |
| 2007/0140338 A1* | 6/2007 | Bhaskaran et al. | 375/240.12 |

FOREIGN PATENT DOCUMENTS

| | | |
|---|---|---|
| WO | WO 2004/080084 | 9/2004 |

OTHER PUBLICATIONS

He, Zhihai, et al., "A Unified Rate-Distortion Analysis Framework for Transform Coding", *IEEE* Transactions on Circuits and Systems for Video Technology, vol. 11, No. 12, Dec. 2001, pp. 1221-1236.

Hyungjoon Kim, et al., "Low-Complexity Macroblock Mode Selection for H.264/AVC Encoders", *IEEE* International Conference on Image Processing, Oct. 2004.

"Efficient Intra-Prediction Algorithm in H.264", B. Meng, et al., 2003, pp. 837-840.

"H.264 and MPEG-4, Video Compression, Video Coding for Next-generation Multimedia", Iain E.G. Richardson, 2003, pp. 170-185.

"Sobol Partial Distortion Algorithm for Fast Full Search in Block Motion Estimation", D. Quaglia, et al., Proceedings of EuroGraphics Multimedia Workshop 2001, Manchester, United Kingdom, Sep. 2001, pp. 87-94.

* cited by examiner

8 x 8 Sub-Block

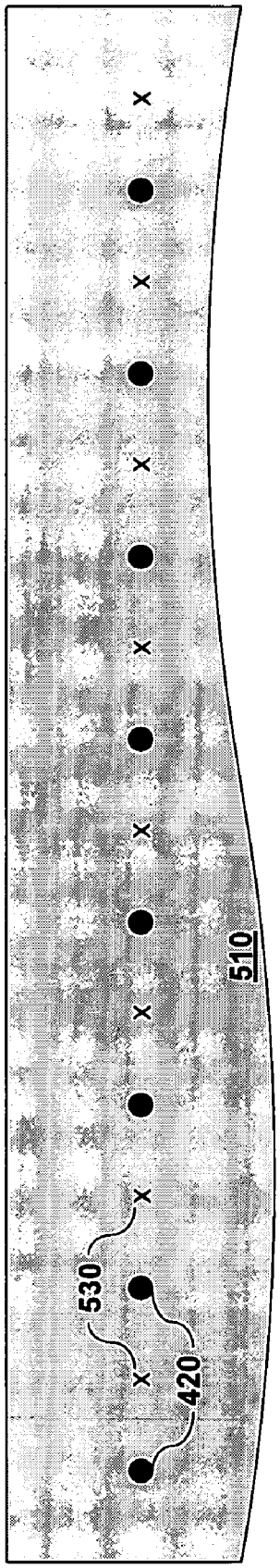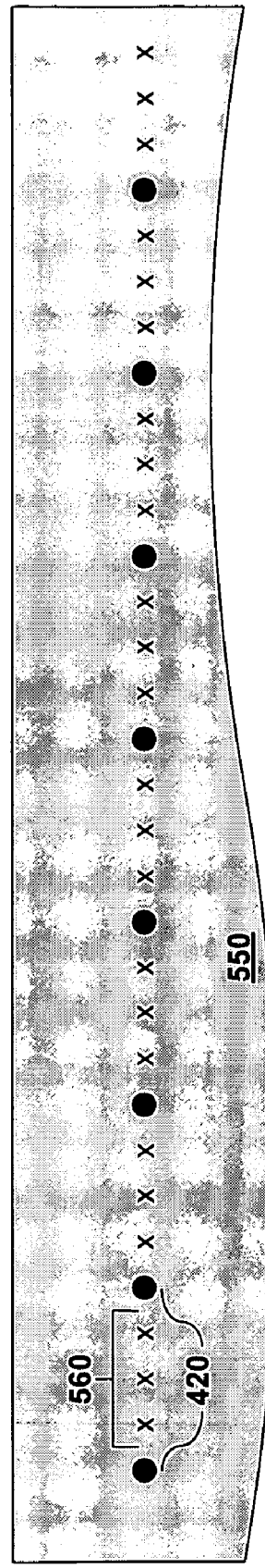
2M x 2N
FIGURE 5A
4M x 4N
FIGURE 5B

MACROBLOCK HOMOGENEITY ANALYSIS AND INTER MODE PREDICTION

REFERENCE TO RELATED APPLICATIONS

This application is related to U.S. patent application entitled "Prediction Mode Selection in an Encoder," Ser. No. 11/041,141, filed on Jan. 21, 2005, and U.S. patent application entitled "Motion Estimation and Inter-Mode Prediction," Ser. No. 11/158,548, filed on Jun. 21, 2005, both of which are incorporated by reference in their entirety.

BACKGROUND

A. Technical Field

The present invention relates generally to the encoding of data for transmission along a communications link, and more particularly, to the selection of prediction modes for a video frame in which data is encoded prior to transmission.

B. Background of the Invention

The burden of high bandwidth applications, such as voice and video, on networks is continually increasing. To facilitate these bandwidth intensive applications, compression technology and standards are evolving to allow these applications to be more effectively communicated across a network to a client. One such standard that relates to the encoding and decoding of video signals is MPEG-4's latest video coding standard referred to as MPEG-4/AVC (Advanced Video Coding Standard), which is also commonly referred to by its International Telecommunications Union standard name of H.264. For higher coding efficiencies, MPEG-4/AVC provides tools for variable block size motion compensation prediction for encoding video macroblocks. This prediction may also include sub-pixel interpolation within a block to further increase the performance of encoding the macroblock.

Although this standard generally improves the method in which data is encoded, it may also place a significant strain on the processing resources of the encoder itself. Because of the time-sensitive nature of transmitting and receiving video data, an encoder has a limited amount of time to select an appropriate encoding method for a video frame, encode the video frame, and transmit the frame onto a network. The quality of the video signal may be jeopardized if the encoder is unable to complete all of the necessary encoding computations, within the requisite time, that may be needed to encode and transmit the video signal.

FIG. 1 illustrates a typical communications link 120 on which an encoded video signal may be communicated. As illustrated, a video camera 110 generates a video signal which is sent to an encoder 115. This encoder 115 may be software located on a computer or server that is connected to the communications link 120. The encoder 115 receives a video frame which is typically divided in macroblocks for encoding purposes. Depending on the content homogeneity within these macroblocks, they may be further partitioned into smaller blocks to allow more precision in the encoding process.

Each of these macroblocks, and sub-blocks within a macroblock, may be encoded relative to another block located within the same video frame or relative to a block in a previous or future reference frame within the video signal. This encoding is intended to reduce the amount of data redundancy that is transmitted on the communications link 120.

There are typically two types of modes, intra and inter mode, in which a macroblock may be encoded. Intra mode encoding defines an encoding process relative to one or more blocks within the same video frame. Inter mode encoding defines an encoding process relative to one or more reference frames outside the current video frame. After a macroblock is encoded, it is transmitted, via the communications link 120, to a receive-side decoder 125. The decoder 125 reconstructs the macroblock within the video signal so that it may be shown on the display device 130.

As mentioned above, when inter mode encoding is performed, a macroblock (e.g., a 16×16 block within a video frame) is encoded relative to a macroblock in another reference frame. The encoder may select from a number of different modes to encode a particular macroblock. In a number of current systems, motion compensated prediction analysis for each of the modes is performed to select a preferred mode.

Motion compensated prediction may be performed at both integer-pixel and sub-pixel levels depending on the application and standard being applied. Integer-pixel compensation focuses on motion estimation and prediction corresponding to pixel values within a reference frame or frames. Comparatively, sub-pixel compensation focuses on motion estimation and prediction corresponding to interpolated sample positions within a reference frame or frames. This sub-pixel compensation may be performed according to various sub-pixel interpolation granularities, including half-pixel and quarter-pixel compensation, from which the interpolated sample positions are generated. Typically, sub-pixel compensation provides better performance and coding efficiency than integer-pixel compensation. However, sub-pixel compensation has been more complex and required more processing resources than integer-pixel compensation.

SUMMARY OF THE INVENTION

The present invention potentially reduces the processing requirements in selecting an inter mode for encoding a video macroblock. In particular, motion estimation complexity is potentially reduced at either the integer-pixel level and/or the sub-pixel level. In some cases, sub-pixel motion estimation may be eliminated entirely.

In one embodiment of the invention, homogeneity within the video macroblock is quantified, such as through a rate-distortion ("RD") computation, so that the number of potential inter modes may be reduced without further analysis. This RD computation may be accomplished by calculating a RD cost for a SKIP mode that quantifies the amount of spatial distortion within the macroblock relative to a (0,0) motion vector. Depending on the value of the SKIP mode RD cost, the number of modes that are further analyzed may be reduced as certain modes are filtered out according to this RD cost value.

Motion estimation may subsequently performed on the modes that were not previously removed based on the macroblock homogeneity. In one embodiment of the invention, the motion estimation employs a seed reference block and a seed motion vector to select an initial search point for a reference block and motion vector associated with a particular mode. Based on this motion estimation, RD efficiencies are calculated for each of the analyzed modes and an inter mode is selected.

In one embodiment of the invention, sub-pixel motion compensated prediction is performed relative only to the selected inter mode. This sub-pixel prediction may be performed at various granularities including both half-pixel and quarter-pixel interpolation. RD efficiencies may be calculated for the sub-pixel modes and based on this calculation(s) a sub-pixel mode, if any, is selected.

In one embodiment of the invention, a bypass strategy for motion estimation is performed in which calculations for half-pixel and quarter-pixel motion vectors are performed only on macroblocks that meet a certain threshold. The threshold itself is adaptively determined based on image quality considerations, power availability, and/or available compute time.

Thereafter, an encoding mode for the macroblock is selected. This selection may be taken from a preferred inter mode, a preferred intra mode, a SKIP mode or sub-pixel mode thereof. One skilled in the art will recognize that various methods may be used in this selection process.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 5A is an illustration of a pixel row, within an 8×8 sub-block, showing half-pixel granularity.

FIG. 5B is an illustration of a pixel row, within a 8×8 sub-block, showing quarter-pixel granularity.

DETAILED DESCRIPTION OF THE PREFERRED EMBODIMENTS

Figure 1:
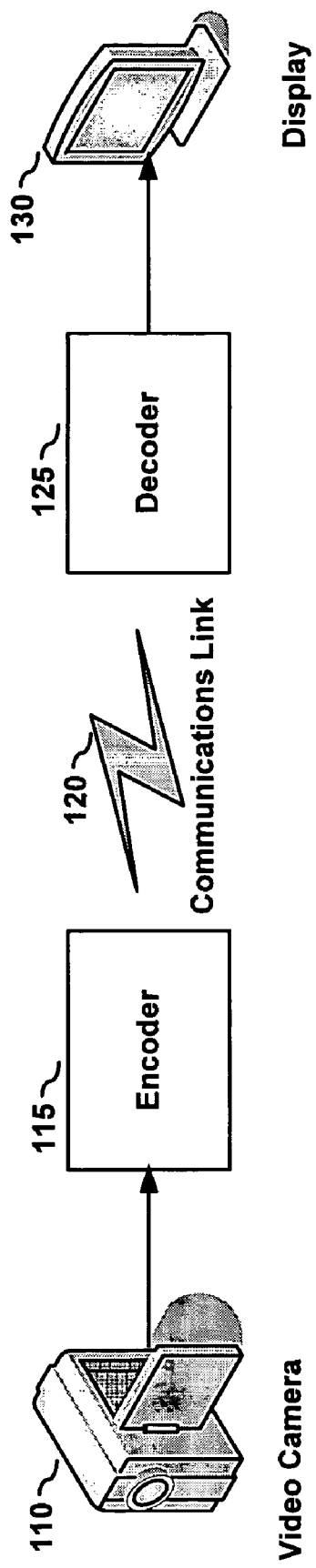
FIG. 1 is an illustration of a communication link on which data may be encoded and decoded.

An apparatus and method for selecting an inter mode for encoding a video macroblock is described. In one embodiment of the present invention, the number of potential inter modes is filtered, after an initial analysis of homogeneity for a macroblock, in order to reduce the number of modes that are analyzed. This initial reduction of inter modes that are to be analyzed may significantly reduce the computing resources required for inter mode selection. Motion estimation and corresponding RD efficiency calculations (e.g., RD cost computations) are performed for the remaining inter modes. Based on the motion estimation and RD efficiency calculations, a preferred inter mode is selected. In another embodiment of the invention, sub-pixel motion estimation analysis is performed only on the preferred inter mode. In particular, interpolated sample positions, at a sub-pixel level, within a reference frame are used to perform motion compensation estimation in the preferred inter mode for a macroblock. Sub-pixel prediction may be performed at half-pixel, quarter-pixel, or other pixel granularity. In yet another embodiment of the invention, sub-pixel motion estimation analysis is bypassed for those macroblocks that do not meet a certain threshold, which can be, and preferably is, determined adaptively based on image quality considerations, power availability, and/or available compute time.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different devices including personal computers and network servers. The embodiments of the present invention may also be present in software, hardware or firmware. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

C. Overview

The present invention identifies a prediction inter mode or modes that may be used to encode a video signal macroblock. The selection of an inter mode for a particular video signal macroblock may depend on a number of factors including the homogeneity of the macroblock itself. This homogeneity may be measured by its spatial variance relative to a (0,0) motion vector. As the amount of distortion within the macroblock increases, the macroblock homogeneity decreases. The cost of encoding this distortion, for a particular mode and relative to a reference block, may be measured in an RD cost computation.

The selection of a particular mode may significantly depend on the macroblock homogeneity. Depending on the mode that is selected, the macroblock may be partitioned into various sub-blocks. Typically, the complexity and required number of computations for an encoding process increases relative to the number of sub-blocks in which the macroblock is divided. Thus, as a macroblock is partitioned into more sub-blocks, the complexity of the mode in which the macroblock is encoded becomes more complex and also more able to effectively compensate for larger amounts of distortion.

As mentioned above, one factor that may be used in selecting an appropriate mode is a RD cost computed for each mode. An analysis of each mode's RD cost allows for the selection of an appropriate prediction mode for a particular block. However, these rate-distortion computations may be processor intensive and place a burden on the encoder to timely encode the video signal. The rate-distortion value is defined as:

$$J(s, c, m|QP, \lambda_m) = SSD(s, c, m|QP) + \lambda_m * R(s, c, m|QP),$$

where QP is the macroblock quantization parameter, $\lambda_m$ is the Lagrange multiplier for mode decisions, SSD is the sum of the squared differences between the original block and a reconstructed block, and R represents the number of bits associated with the mode.

The complexity of the rate-distortion computation, and the number of times the computation is performed, directly affects the time and resources required to identify a prediction mode for a block. Depending on the encoder, and the system in which the encoder operates, these computations may overload the encoder resulting in a degradation of the encoding system performance.

The present invention may reduce the number of inter modes that are analyzed and the number of computations for those modes that are analyzed during selection of an encoding mode for a macroblock. An initial analysis of macroblock homogeneity may allow certain inter modes to be quickly removed from those for which motion estimation is to be performed. For example, an initial RD cost calculation may be performed for a SKIP mode in order to estimate the amount of distortion within the macroblock corresponding to a (0,0) motion vector. If the calculation suggests that the level of complexity required to encode the macroblock is low, then a first set of inter modes, typically used for encoding lower levels of macroblock distortion, will be analyzed. As the complexity for encoding the macroblock increases, then a second set of inter modes, typically used for encoding high levels of macroblock distortion, will be analyzed.

Motion estimation is performed on the appropriate inter modes to identify corresponding reference blocks and motion vectors for each of these inter modes. Thereafter, RD efficiencies for each of the modes are calculated, such as by performing an RD cost calculation for each of the modes. Based on the inter mode RD efficiencies, a preferred inter mode is selected.

In one embodiment of the invention, sub-pixel motion estimation is only performed relative to the selected inter mode. In particular, motion compensation may be performed relative to interpolated sample positions within a reference frame in order to refine the macroblock encoding. Rate-distortion computations may then be performed on each of the analyzed sub-pixel modes so that an appropriate mode may be selected.

In one embodiment of the invention, sub-pixel motion estimation is eliminated for those macroblocks that do not meet a certain adaptively determined threshold.

After a preferred inter mode is selected, the macroblock is encoded using that inter mode and transmitted onto a communication link. A client at the other end of the link receives this information and reconstructs the macroblock.

D. Encoder

Figure 2:
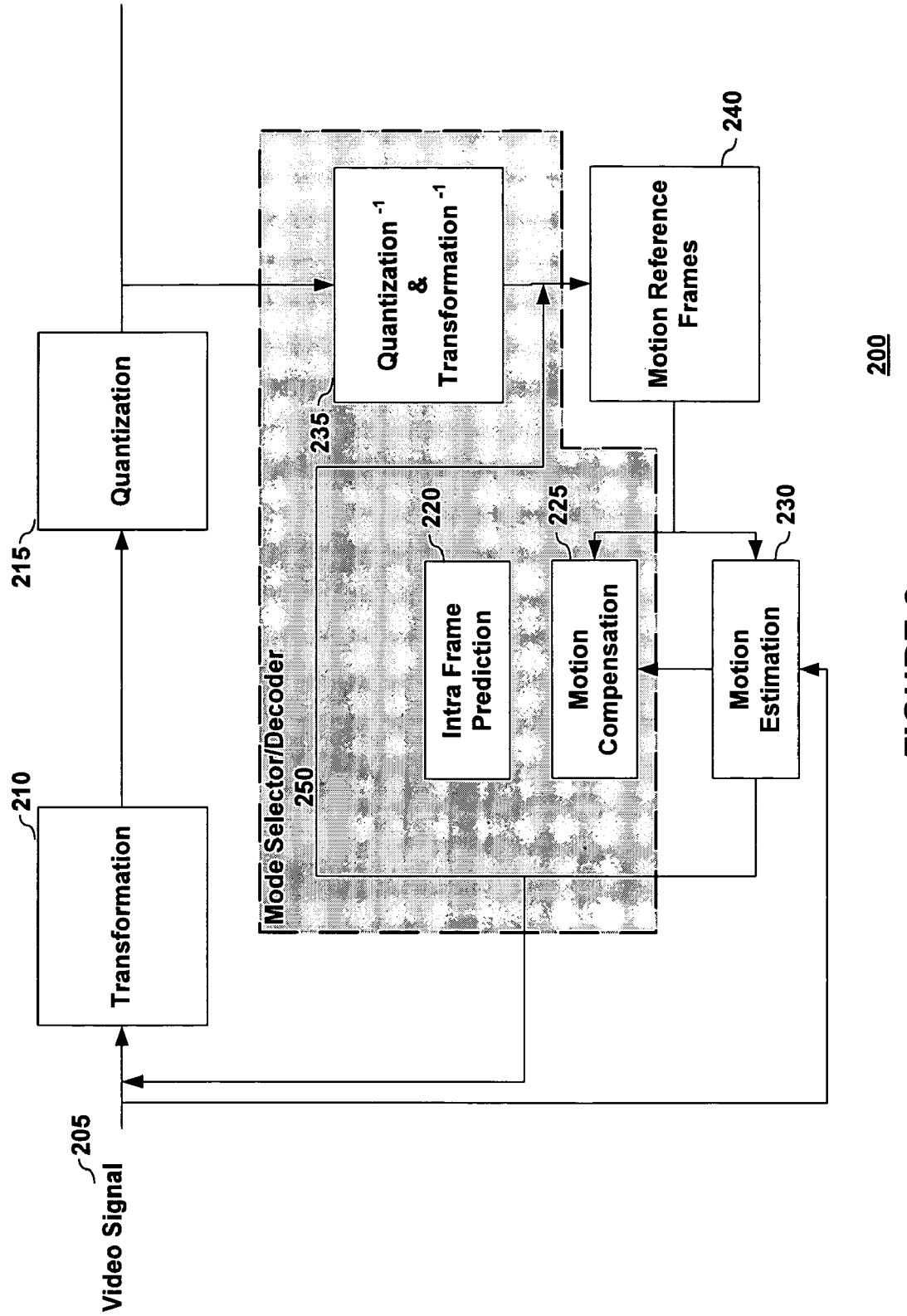
FIG. 2 is a general block diagram of an encoder according to one embodiment of the invention.

FIG. 2 illustrates an encoder 200, including a mode selector 250, according to one embodiment of the invention. A frame within a video signal 205 is transformed by a transformation module 210 using a direct cosine transformation ('DCT') into a set of spatial frequency coefficients; this DCT is analogous to a transformation from a time domain signal into a frequency domain signal. The frequency coefficients are then quantized by a quantization module 215 which applies a scalar to the frequency coefficients. In effect, the quantization process divides the frequency coefficients by an integer scaling factor resulting in a truncated signal. This process of transforming and quantizing the video frame introduces error, such as lost data, into the video signal.

The encoder 200 also includes a mode selector 250 that identifies a mode or modes in which each macroblock in a frame is encoded. This mode selector 250 includes a reverse quantization and transformation module 235, an intra-frame prediction module 220, and a motion compensation module 225. The mode selector 250 may interface with or include a motion estimation module 230 and a memory device that stores multiple motion reference frames 240.

The reverse quantization and transformation module 235 reconstructs a macroblock that had been previously transformed and quantized so that the amount of error introduced into the video signal by the encoding processing may be identified. Reconstruction occurs by reverse quantizing a video signal, which results in a rescaled signal. This rescaled signal is then inversely transformed by an inverse discrete cosine transform to produce a reconstructed frame. This reconstructed frame may be compared to the original video frame 205 to identify the error introduced by the encoding process. Each macroblock within the video signal 205 may be encoded in one of multiple different inter or intra prediction modes, each having a particular associated error value.

The intra frame prediction module 220 identifies a potential prediction intra mode for a macroblock. As mentioned above, intra mode encoding uses other blocks within the same video frame to predict a particular block in an intra frame. This identified intra mode is compared to an inter mode to determine whether a macroblock should be encoded using an inter or intra mode. An intra mode may be selected using numerous different methods and devices including those described in the U.S. Patent Application entitled "Prediction Mode Selection in an Encoder" referenced above.

The motion estimation module 230 identifies a reference block and a motion vector representative of a spatial displacement between the reference block and the block that is to be encoded in an inter mode. The reference block may be located within a single video reference frame or may be generated from multiple blocks within a reference frame or multiple reference frames. The motion vector represents movement of the reference block within a two dimensional grid relative to the position of the block that is to be inter encoded.

The motion compensation module 225 predicts a macroblock from other previously decoded blocks in previous frames that may be used in an inter coding process. This prediction is done by identifying an error or distortion level associated with the reference block and motion vector relative to the particular block that is to be inter encoded. This error is encoded and provided to a receiving client so that the particular block may be reconstructed from the reference block and motion vector data. As described above, each inter mode will have an associated error value for the particular block. This error value is a significant component in the rate-distortion performance of each of the modes and may be an important consideration in the selection of a single inter encoding mode for the particular block. An inter mode may be selected using numerous different methods and devices including those described in the U.S. Patent Application entitled "Motion Estimation and Inter-Mode Prediction" referenced above.

Once an encoding mode has been selected (either inter or intra mode), the macroblock is encoded accordingly and transmitted onto a communication link. This encoded data may be used by a client to reconstruct the macroblock and display it.

E. Prediction Inter Modes and Sub-Pixel Interpolation

Figure 3:
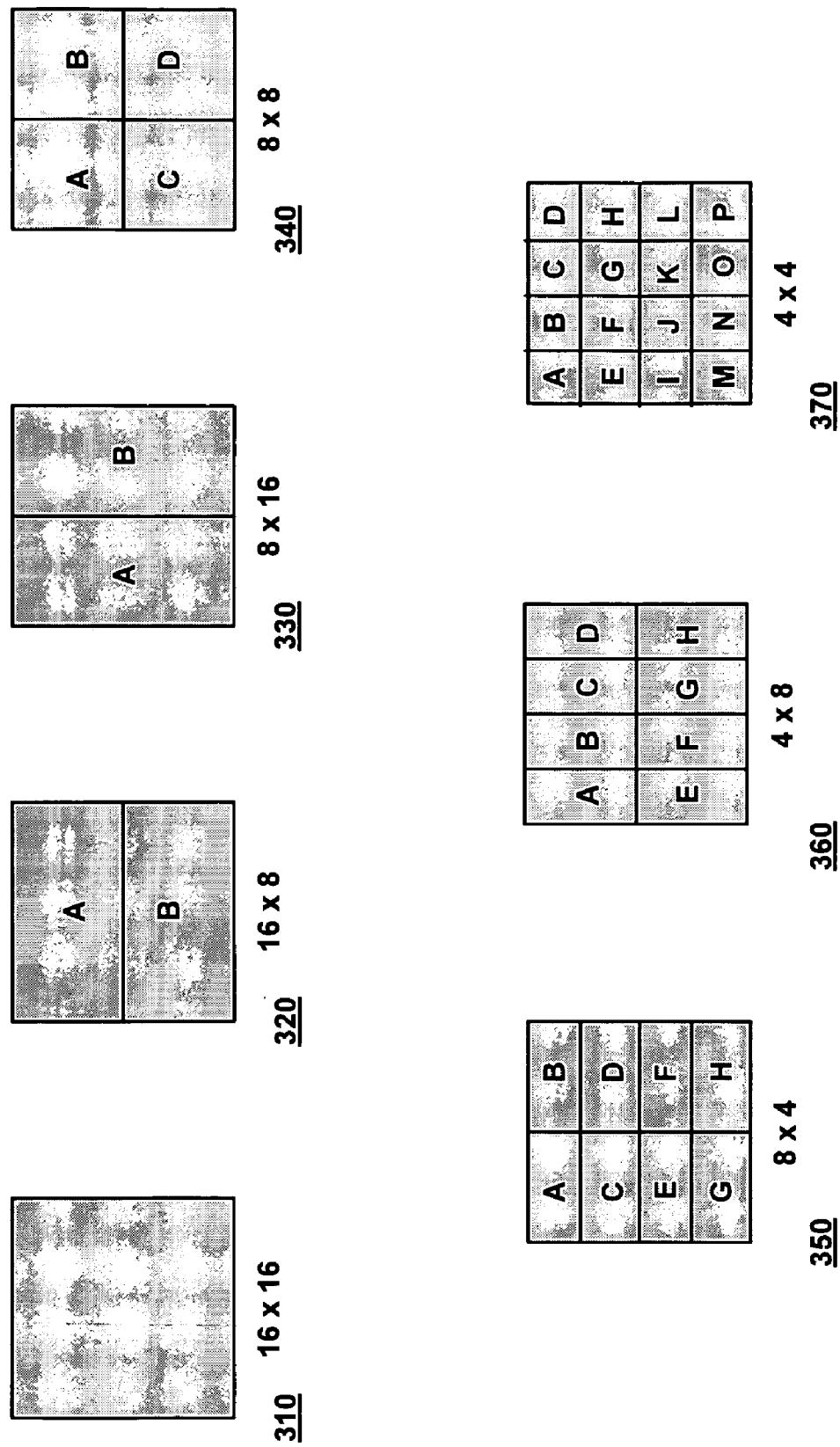
FIG. 3 is a block diagram of modes available for inter-mode encoding according to one embodiment of the invention.

FIG. 3 illustrates exemplary prediction inter modes that may be used in accordance with an embodiment of the invention. These modes are defined by the H.264 specification and include seven different inter modes in which a 16×16 macroblock may be partitioned into blocks. A 16×16 mode 310 does not partition a macroblock, rather the entire macroblock is encoded as a single block. A 16×8 mode 320 horizontally divides the macroblock into two 16×8 blocks with each block being individually encoded. An 8×16 mode 330 vertically divides the macroblock into two 8×16 blocks with each block being individually encoded. An 8×8 mode 340 partitions the macroblock into four 8×8 blocks with each block being individually encoded. An 8×4 mode 350 partitions the macroblock into eight 8×4 blocks with each block being individually encoded. A 4×8 mode 360 partitions the macroblock into eight 4×8 blocks with each block being individually encoded. A 4×4 mode 370 partitions the macroblock into sixteen 4×4 blocks with each block being individually encoded.

Generally, the level of complexity and encoding accuracy increases relative to number of blocks in which a macroblock is partitioned and encoded. Thus, if a macroblock contains a significant amount of distortion then a mode with more partitioned blocks, such as a 4×4 mode 370, may be used to more accurately communicate the distortion within the macroblock. However, the amount of processor resources and bandwidth requirements that are need for encoding in a 4×4 mode are relatively large compared to the other modes described above. Thus, if there is very little distortion within a macroblock, then a less demanding mode, such as a 16×16 mode 310, may be used in order to preserve resources for encoding other macroblocks.

F. Integer and Sub-Pixel Motion Estimation

Figure 4:
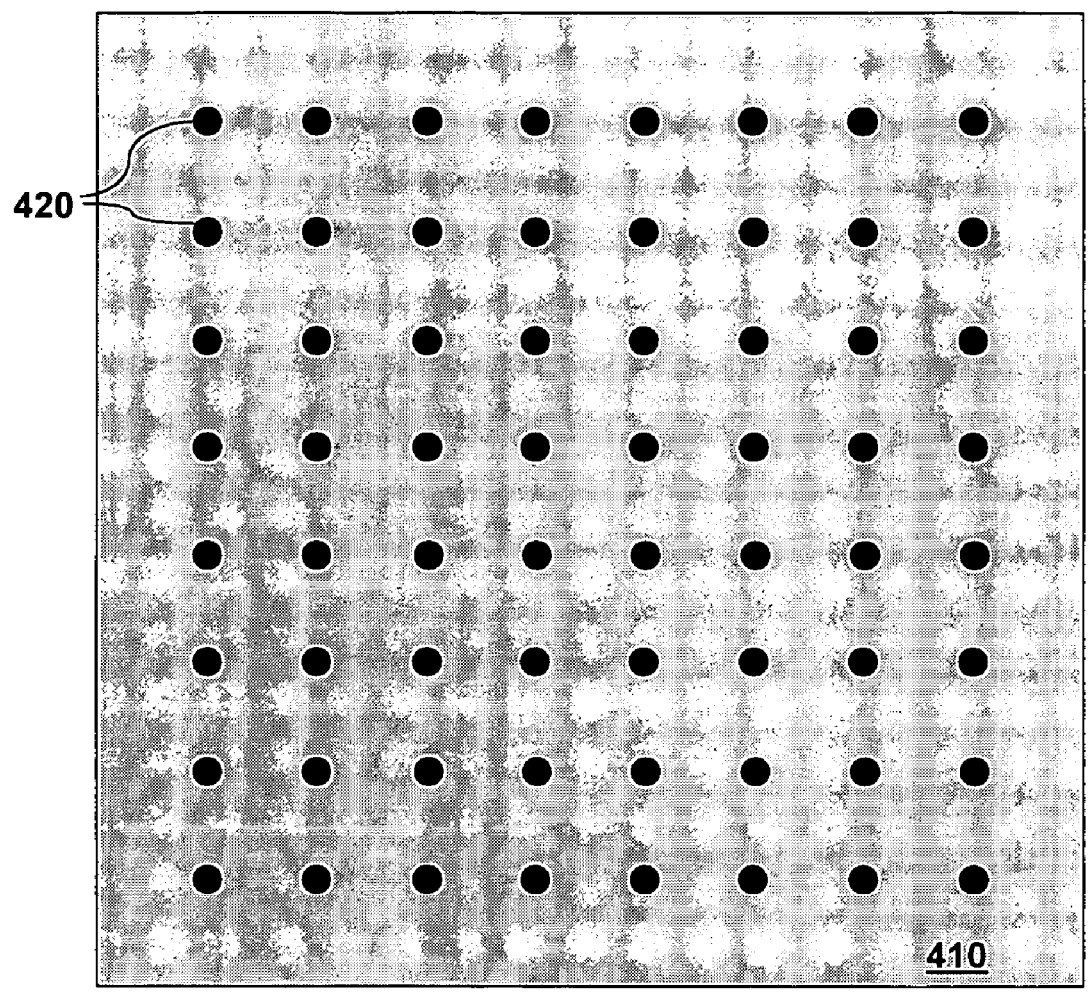
FIG. 4 is an illustration of an 8×8 pixel sub-block.

FIG. 4 illustrates an exemplary 8×8 block 410 having 64 individual pixels 420. Integer pixel motion estimation may be performed using just the pixel values of pixels within the block 410. For example, during integer pixel motion estimation, pixel values within a block are compared to pixel values within a reference frame(s) in order to identify a reference block and motion vector.

FIGS. 5A and 5B illustrate half-pixel and quarter-pixel interpolation that may also be used during motion estimation to improve encoding accuracy. FIG. 5A shows a pixel row with pixel values 420 and sub-pixel values 530 relating to half-pixel motion estimation and encoding. The pixel values 420 and sub-pixel values 530 may be analyzed to generate a more accurate value representative of an area containing the analyzed pixel value(s) and sub-pixel value(s) within the reference frame.

FIG. 5B shows a pixel row with pixel values 420 and sub-pixel values 560 relating to quarter-pixel motion estimation and encoding. The pixel values 420 and sub-pixel values 560 may be analyzed to generate a value representative of an area containing the pixel(s) and sub-pixels within the reference frame. Typically, quarter-pixel interpolation is more accurate than half-pixel interpolation. One skilled in the art will recognize that various methods of sub-pixel interpolation may be done and that these sub-pixel interpolations may be done at various pixel granularities; all of which are intended to be within the scope of the present invention.

G. Macroblock Homogeneity Analysis and Inter Mode Selection

Figure 6:
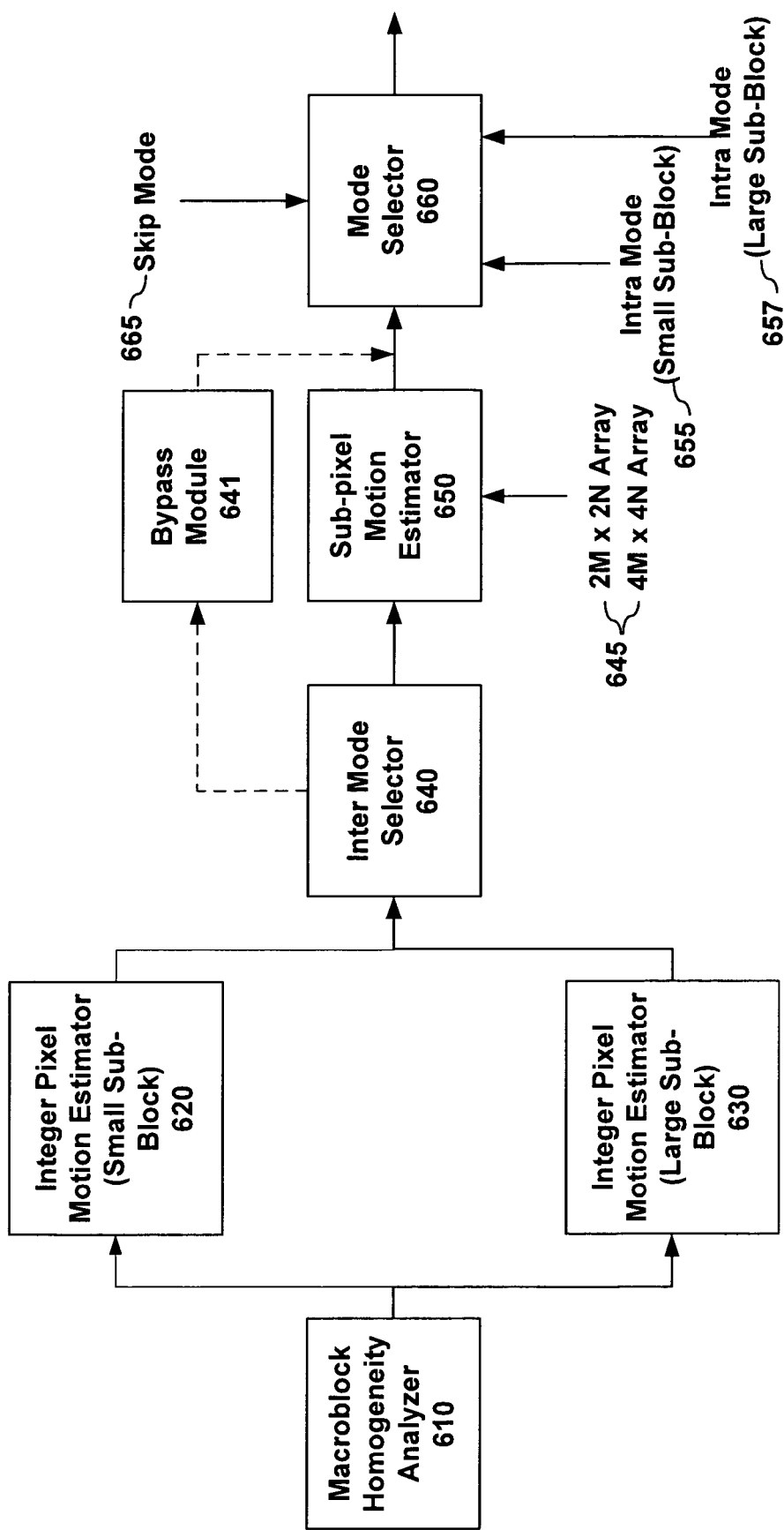
FIG. 6 is a block diagram of an inter mode selector, including sub-pixel motion estimation, and mode selector according to one embodiment of the invention.

FIG. 6 is a block diagram illustrating a mode selector according to one embodiment of the invention. The mode selector is able to significantly reduce the number of computations performed during motion estimation and mode selection with minimal loss in encoding performance.

According to one embodiment of the invention, a macroblock homogeneity analyzer 610 analyzes the homogeneity level within the macroblock. As described above, this macroblock homogeneity corresponds to the level of distortion within the macroblock and may be used to suggest likely inter modes, which may be more efficient in encoding the macroblock. Various methods may be used to compute the distortion level including an RD cost computation for the macroblock. A simpler method of reducing inter mode analysis is provided below and a more complex method is provided in relation to FIG. 7.

In one embodiment of the invention, the number of inter modes is reduced for which motion estimation and RD efficiency calculations are performed. If the macroblock is relatively homogenous, then the inter modes with larger block sizes are analyzed (e.g., 16×16, 8×16, 16×8, 8×8). For example, an integer pixel motion estimator (large sub-block) 630 may perform motion estimation on the inter modes with larger block sizes. However, if the macroblock is not relatively homogenous, then the inter modes with smaller block sizes are analyzed (e.g., 8×8, 8×4, 4×8, 4×4). For example, an integer pixel motion estimator (small sub-block) 620 may perform motion estimation on the inter modes with smaller block sizes.

An inter mode selector 640 identifies an appropriate inter mode using the motion estimation performed on particular modes. In one embodiment, RD costs are calculated for each of the analyzed inter modes and an appropriate inter mode is selected.

Subject to the results of an optional bypass strategy performed by bypass module 641, the functions of which is explained in more detail in the next sub-section, a sub-pixel motion estimator 650 performs sub-pixel motion estimation relative to the selected inter mode. As compared to other types of encoders in which sub-pixel motion estimation is performed relative to multiple inter modes, the sub-pixel motion estimator 650 performs motion estimation on a single mode. It is important to note that multiple motion estimation calculations may be performed relating to different sub-pixel granularities on the inter mode. This reduction in the number of sub-pixel motion estimation calculations may significantly reduce the burden on the encoder's processing resources.

The sub-pixel motion estimator 650 may perform sub-pixel estimation at various granularities, such as 2M×2N arrays and 4M×4N arrays 645. The actual sub-pixel motion estimation granularity may depend on the relevant encoding standard or video application. In addition, various sub-pixel interpolation methods may be employed to identify interpolated sample positions within a reference frame or frames from which prediction may occur.

A mode selector 660 selects an encoding mode from a SKIP mode, intra modes, and inter modes. In one embodiment, the mode selector 660 analyzes the selected inter mode, the SKIP mode 665, an intra mode relating to small sub-blocks 655, and an intra mode relating to large sub-blocks 657. Exemplary devices and methods for selecting the two intra modes 655, 657 are described in the U.S. Patent Application entitled "Prediction Mode Selection in an Encoder," referenced above.

Once a mode has been selected, the macroblock is encoded according to the selected mode and transmitted onto a communications link.

Figure 8:
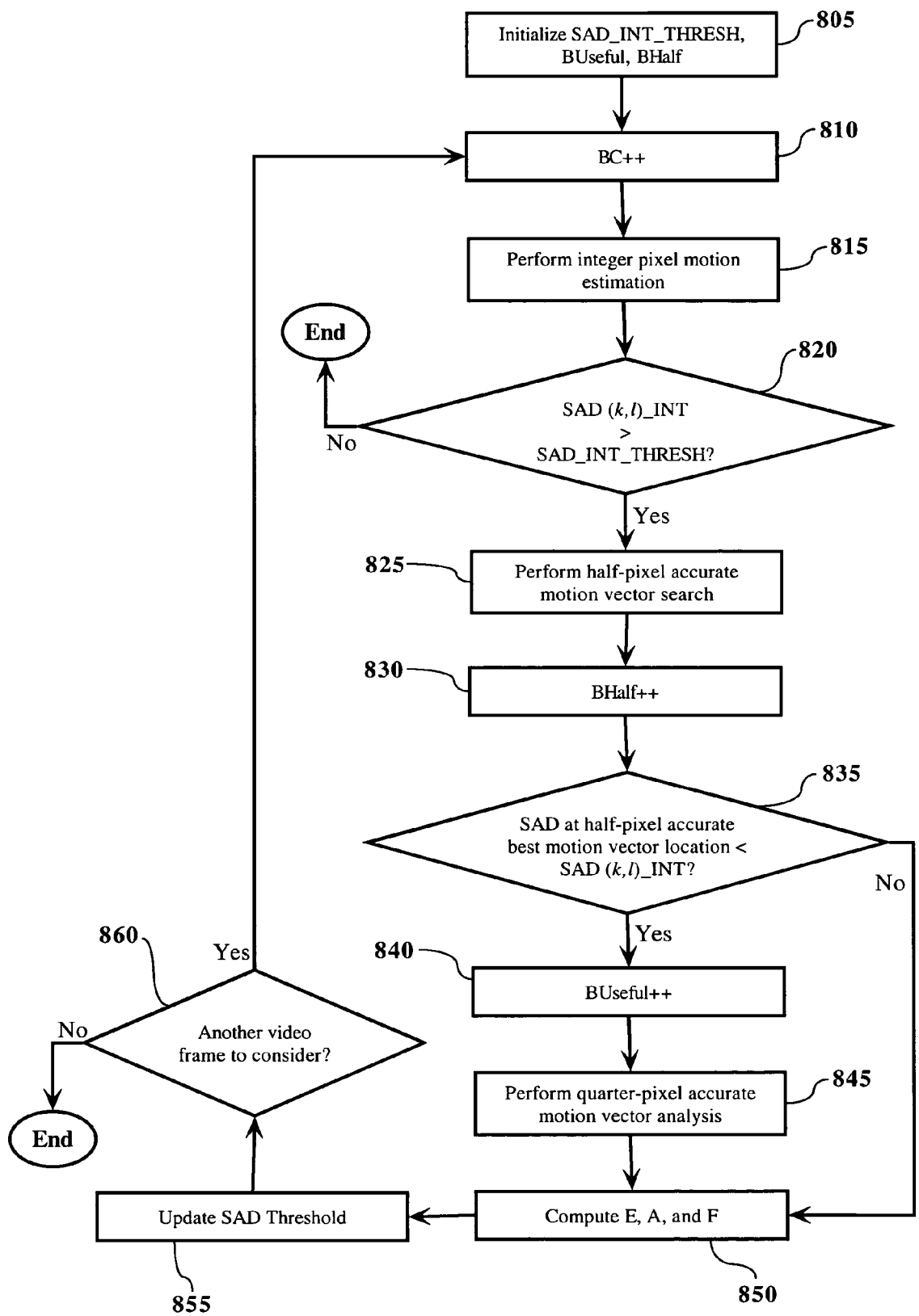
FIG. 8 is a flowchart illustrating a method for adaptive SAD_INT_THRESH adjustment and reduction of motion estimation complexity according to one embodiment of the invention.
Figure 9:
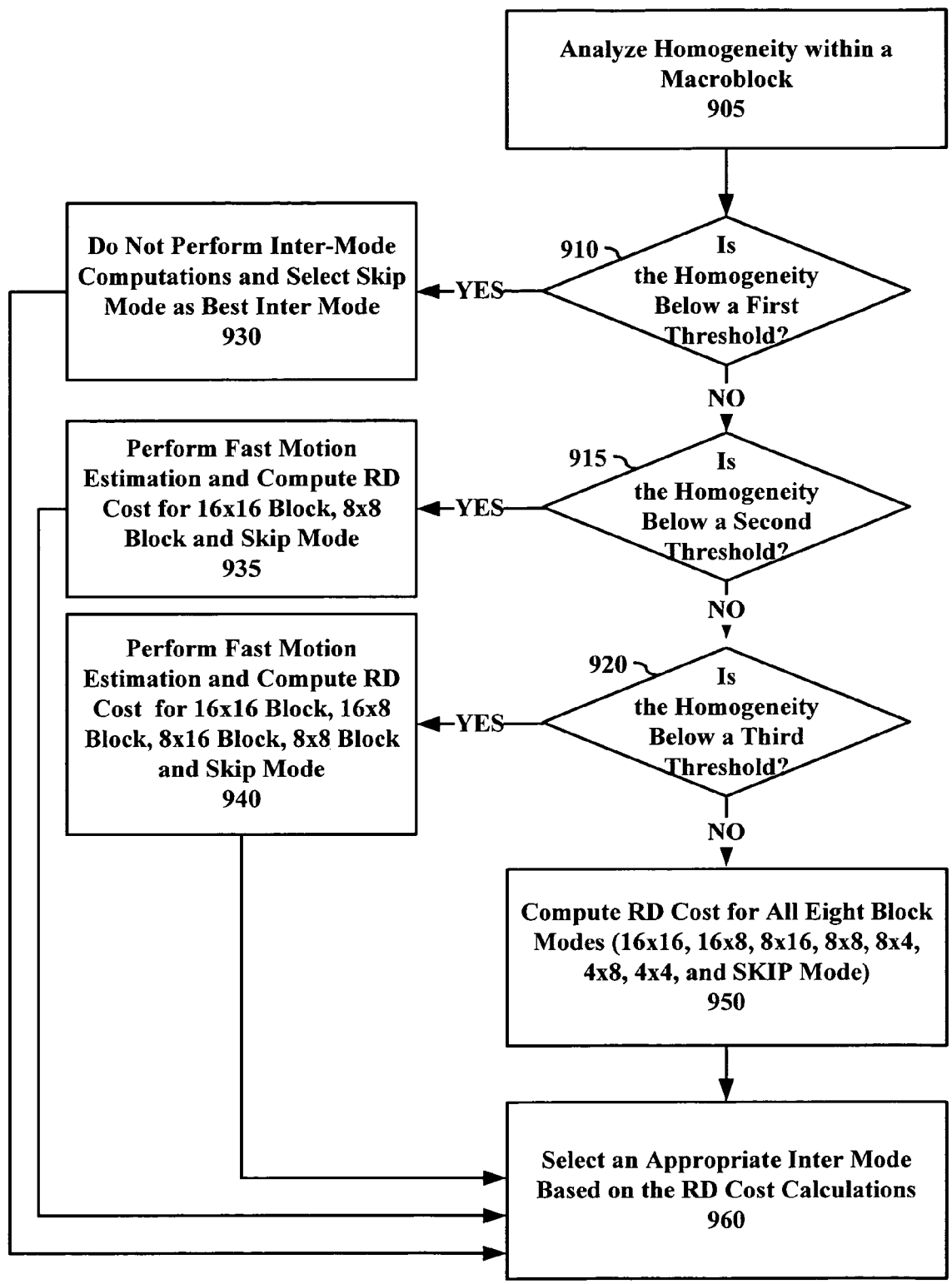
FIG. 9 is a flowchart illustrating a method for reducing the number of modes to be analyzed based on the homogeneity of a macroblock according to one embodiment of the invention.

The reduction of the number of integer and sub-pixel motion estimation computations may significantly lower the burden in selecting a mode. One skilled in the art will recognize that the manner in which the integer motion estimation calculations are reduced according to macroblock homogeneity may be performed using various methods, each of which may have advantages and disadvantages relating to accuracy and number of computations. FIG. 8 illustrates a bypass strategy in which sub-pixel motion estimation calculations are skipped for macroblocks that exhibit little or no motion. FIG. 9 illustrates an additional method in which macroblock homogeneity may be used to reduced the number of inter modes for which motion estimation and RD efficiency calculations are performed.

a) Sub-pixel Motion Estimation Complexity Reduction

The bypass strategy performed by module 641 eliminates sub-pixel, i.e., half-pixel and/or quarter-pixel motion vector calculations, for some macroblocks, thus reducing the overall complexity of the motion estimation process. The bypass strategy is described below.

In determining whether two macroblocks are similar or not, during the motion estimation process, a sum of absolute differences (SAD) is computed for each motion vector. For motion vector (k,l), $$SAD = \sum_{i=0}^{M-1} \sum_{j=0}^{N-1} |C_{ij} - R_{i+k,j+l}|,$$

where the macroblock dimensions are M×N, $C_{ij}$ is the $(i,j)^{th}$ pixel in the current frame, $R_{ij}$ is the $(i,j)^{th}$ pixel in the previously encoded frame, and the macroblocks's top left pixel has location (k,l).

Figure 7:
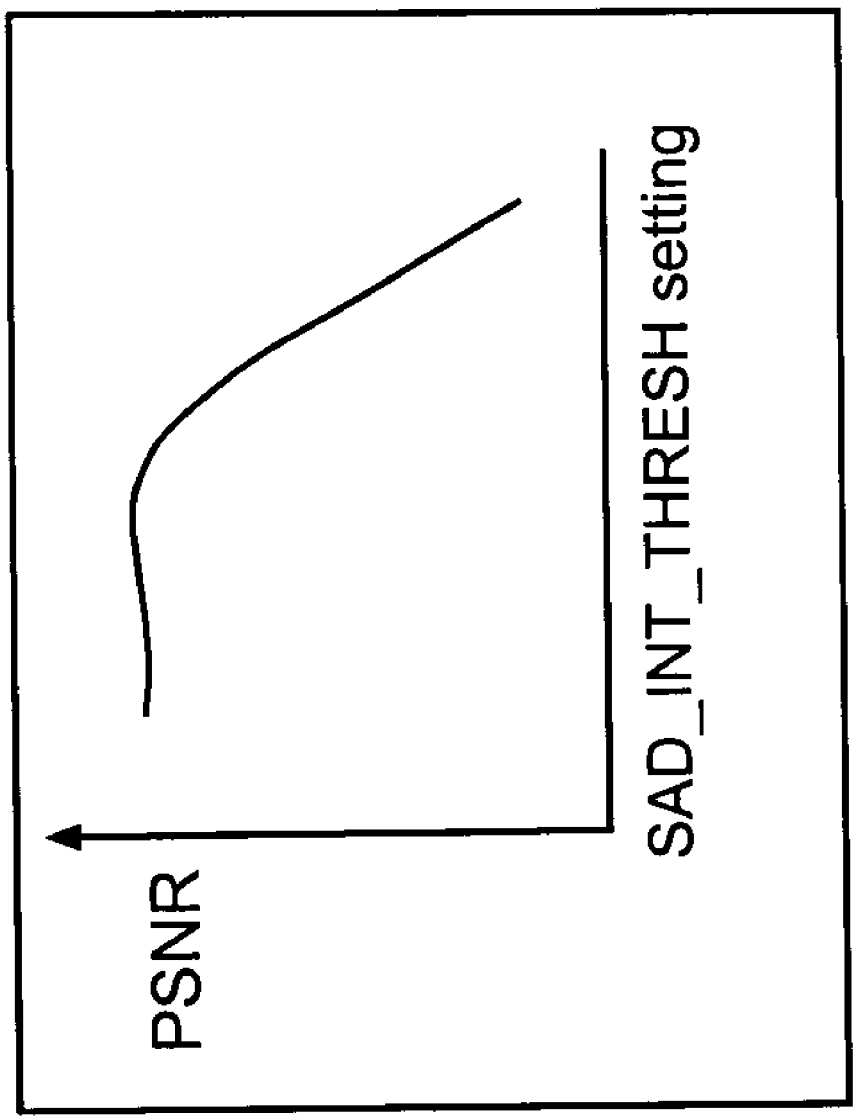
FIG. 7 is a plot of PSNR vs. SAD_INT_THRESH for illustration of a principle in one embodiment of the invention.

Based on experiments, we have observed that over all the integer pixel accurate search locations, if the smallest SAD is less than a certain threshold, SAD_INT_THRESH, then most likely sub-pixel accurate motion vectors are not needed for this particular macroblock. Rather, the inter mode can be predicted using only an integer pixel motion estimation. Only those macroblocks for which SAD>SAD_INT_THRESH are sub-pixel accurate motion vectors needed. To determine SAD_INT_THRESH, several sample video sequences can be examined with different SAD_INT_THRESH values. Then, for a fixed bit rate, find the corresponding image quality measure, i.e., Peak-Signal-to-Noise Ratio (PSNR). A relationship between PSNR and various settings of SAD_INT_THRESH can then be obtained. A typical plot of PSNR vs. various SAD_INT_THRESH settings is shown in FIG. 7. Selecting an SAD_INT_THRESH that will lead to a relatively high reduction in the number of macroblocks in which sub-pixel motion estimation is performed but will not adversely affect decoded image quality is preferable. With these requirements and given the relationship of FIG. 7, a SAD_INT_THRESH at the "knee" of the curve should be selected.

SAD need not, and preferably is not, the same for all video sequences. Rather, determining SAD is preferably an adaptive process that adjusts itself on a macroblock-by-macroblock or frame-by-frame basis. An adaptive SAD_INT_THRESH adjustment and reduced motion estimation complexity according to an embodiment of the invention is shown in the flowchart of FIG. 8.

Initially, SAD_INT_THRESH, macroblock count (BC), count of macroblocks in which half-pixel motion vector calculations are deemed useful (BUseful), and count of macroblocks, and count of macroblocks in which half-pixel motion vector search is performed (BHalf) are respectively set 805 to initial values. In one embodiment, those initial values are SAD_INT_THRESH=300, which was determined from experiments, BUseful=0, and BHalf=0. Then, for each macroblock in a current video frame C, the following steps 810-845 are performed.

As each macroblock is received, increment BC++ 810.

Perform interger pixel motion estimation 815, letting the best integer pixel accurate motion vector be a location (k,l) and the resulting similarity measure be SAD(k,l)_INT.

If SAD(k,l)_INT>SAD_INT_THRESH 820, then a half-pixel accurate motion vector search is done 825. Increment macroblock count at this level as BHalf++ 830. If SAD at the half-pixel accurate best motion vector location is less than SAD(k,l)_INT 835, then the half pixel motion vector calculations are deeemed useful and the corresponding block count for this is incremented 840, that is, increment BUseful++.

As for quarter-pixel accurate motion vectors, analysis 845 is confined to only those pixel locations adjacent to the location of the best half-pixel accurate motion vector, that is, pixel locations 1, 2, . . . , 8, as shown in the diagram below.

| 1 | 2 | 3 |
|---|---|---|
| 4 | X | 5 |
| 6 | 7 | 8 |

If the minimum SAD among locations X, 2, 4, 5, and 7=the minimum SAD at X, then stop, as this indicates that half-pixel accurate motion vector analysis is sufficient. Or else, if the minimum SAD among locations X, 2, 4, 5, and 7=the minimum SAD at 2, then test locations 1 and 3 also. Or else, if the minimum SAD among locations X, 2, 4, 5, and 7=the minimum SAD at 4, then test locations 1 and 6 also. Or else, if the minimum SAD among locations X, 2, 4, 5, and 7=the minimum SAD at 5, then test locations 3 and 8 also. Or else, if the minimum SAD among locations X, 2, 4, 5, and 7=the minimum SAD at 7, then test locations 6 and 8 also. Thus, for quarter-pixel accurate motion vectors, at most 6 locations, beyond those tested for half-pixel accurate motion vectors, need to be tested.

The routine of steps 810-845 is repeated for each macroblock of the current frame.

Then, values E, A, and F are computed 850. E=BUseful/BC, A=BHalf/BC, and F=1.25E+0.25, the latter relationship having been obtained empirically through experiment.

The SAD threshold is then updated 855 as follows: SAD_INT_THRESH=SAD_INT_THRESH (1+(A−F)2F).

If there is another video frame to consider 860, the process loops back to step 810 for consideration of each macroblock of the next frame. If not, the process ends.

The bypass strategy potentially reduces complexity by reducing sub-pixel motion vector calculations when appropriate. Since fewer blocks are processed, data accesses are also reduced, leading to less power consumption. In fact, the SAD_INT_THRESH adaptation can be further refined to adapt to the available power of the processor or available cycles for video coding. For example, in step 860, SAD_INT_THRESH can be made to be a function of available power of the processor and/or available cycles for the video coding task.

In addition to being incorporated in the overall inter mode selection process of FIG. 6, this sub-pixel motion vector calculations bypass strategy can be incorporated in any conventional motion estimation methods. The bypass strategy may also be incorporated into the system of the above-identified related application entitled: "Motion Estimation and Inter-Mode Prediction."

b) Inter Mode Reduction Based on Macroblock Homogeneity

FIG. 9 is a flowchart illustrating a method in which macroblock homogeneity may be used to quickly reduce the number of inter modes for which motion estimation and RD efficiency calculations are performed according to one embodiment of the invention.

An analysis is performed 905 on a macroblock to identify a homogeneity level of the macroblock to approximate the complexity of encoding required for the macroblock. This analysis may be performed using various methods including an RD cost computation relating to a SKIP mode for the macroblock itself. This RD cost for the SKIP mode represents the amount of distortion within the macroblock relative to a (0,0) motion vector and is used to approximate which modes should be analyzed. If there is a significant amount of distortion, then the more complex and sub-divided modes are analyzed. If there is very little distortion, then more simple modes are analyzed.

If the homogeneity level is below a first threshold 910 then the SKIP mode is selected and there is not any inter mode analysis performed 930.

If the homogeneity level is above the first threshold and below a second threshold 915, then the number of modes, which are analyzed to identify a reference block and motion vector, is reduced. According to one embodiment, if the SKIP mode RD cost falls between the first and second thresholds, then only the 16×16 mode, the 8×8 mode and the SKIP mode are analyzed. This analysis may include motion estimation and RD efficiency calculations for each of the three modes 935.

If the homogeneity level is above the second threshold and below a third threshold 920, then the number of modes that are analyzed is reduced. According to one embodiment, if the SKIP mode RD cost falls between the second and third thresholds, then only the 16×16 mode, 16×8 mode, 8×16 mode, 8×8 mode and SKIP mode are analyzed 940. Once again, the analysis may include performing motion estimation and RD efficiency calculations for each of the five modes 940.

If the homogeneity level is above the third threshold then all eight inter modes are analyzed 950. According to one embodiment, if the calculated SKIP mode RD cost is above the third threshold, then all eight inter modes are analyzed (16×16 mode, 16×8 mode, 8×16 mode, 8×8 mode, 8×4 mode, 4×8 mode, 4×4 mode and SKIP mode).

Based on RD efficiency calculations, such as RD cost values, an inter mode is selected 960 from the analyzed modes. In one embodiment of the invention, the inter mode is selected in accordance with the mode that most efficiently encodes the video macroblock.

While the present invention has been described with reference to certain exemplary embodiments, those skilled in the art will recognize that various modifications may be provided. Accordingly, the scope of the invention is to be limited only by the following claims.

We claim:

1. A method of selecting an inter mode for encoding a video macroblock, the method comprising the following steps:
    (a) defining a plurality of inter modes, each having a different length and width integer pixel count;
    (b) defining a first set of inter modes and a second set of inter modes utilizing all of said plurality of inter modes, wherein no inter node in said first set is smaller than any inter mode in said second set;
    (c) obtaining a measure of homogeneity of the largest inter mode in said first set;
    (d) IF said measure is not smaller than a predefined threshold, then performing integer motion estimation only on the inter modes in said first set and excluding said second set of inter modes from further processing in the encoding of said video macroblock, ELSE performing motion estimation only on the inter modes in said second set and excluding said first set of inter modes from further processing in the encoding of said video macroblock;
    (e) computing a rate distortion efficiency for the inter modes that are not discarded, and identifying the inter mode that renders the best rate distortion efficiency as the selected inter mode;
    (f) IF it is determined that sub-pixel motion estimation is to be applied in the encoding of the said video macroblock, then applying said sub-pixel motion estimation to only the selected inter mode.

2. The method of claim 1, wherein said measure of homogeneity is a measure of the of the spatial variance of the largest inter mode in said first set relative to a (0,0) motion vector.

3. The method of claim 1, wherein only two sets of inter modes are defined from said plurality of inter modes.

4. The method of claim 3, wherein:
    said plurality of inter modes consists of inter modes defined by a 16×16 macroblock, by 16×8 blocks, by 8×16 blocks, by 8×8 blocks, by 8×4 blocks, by 4×8 blocks, and by 4×4 blocks, and said plurality of inter modes does excludes a SKIP mode;
    said first set of inter modes consists of the inter modes defined by the 16×16 macroblock, the 16×8 blocks, the 8×16 blocks, and the 8×8 blocks; and
    said second set of inter modes consists of the inter modes defined by the 8×8 blocks, the 8×4 blocks, the 4×8 blocks, and the 4×4 blocks.

5. The method of claim 1, wherein in step (f) the determination of whether sub-pixel motion estimation is to be applied in the encoding of the said video macroblock includes:
    IF the smallest Sum of Absolute Differences, SAD, value obtained during the integer motion estimation performed on the selected inter mode is smaller than a SAD_INT threshold value, then it is determined that no sub-pixel motion estimation is to be applied in the encoding of the said video macroblock, ELSE it is determined that sub-pixel motion estimation is to be applied in the encoding of the said video macroblock.

6. The method of claim 5, wherein said SAD_INT threshold value is determined by:
    for a fixed bit rate, determining the Peak-Signal-to-Noise Ratio (PSNR) of a plurality of sample video sequences;
    plotting said PSNR versus various SAD_INT values; and
    selecting the SAD_INT value at the knee of the plot as said SAD_INT threshold.

7. The method of claim 6, wherein said SAD_INT threshold is adaptive and is determined on a macroblock-by-macroblock basis.

8. The method of claim 5, wherein said SAD_INT threshold value is determined by:
    initializing said SAD_INT threshold value to a fixed predefined value, initializing counts BUseful, BHalf and BC to zero;
    for each macroblock in a current video frame, implementing the following step:
    (i) prior to step (a), increment count BC;
    (ii) after step (e) and prior to step (f), defining the location of the best integer pixel motion vector as location (k,l) and its corresponding SAD measure as SAD(k,l)_INT;
        IF SAD(k,l)_INT>SAD_INT threshold, THEN determining that that sub-pixel motion estimation is to be applied in the encoding of the said video macroblock AND incrementing count BHalf AND proceeding to step (f), ELSE determining that that sub-pixel motion estimation is to be applied in the encoding of the said video macroblock AND proceeding to step (f);
    (iii) IF sub-pixel motion estimation is applied in step (f) AND its corresponding SAD value is less than SAD(k,l)_INT, THEN incrementing count BUseful;
    (iv) compute values E, A, and F defined as E=BUseful/BC, A=BHalf/BC, and F=1.25E+0.25;
    (v) update SAD_INT threshold by letting be equal to SAD_INT threshold (1+(A−F)2F).

9. The method of claim 8 wherein in step (f), said sub-pixel motion estimation includes application of half-pixel motion estimation and selective application of quarter pixel motion estimation as follows:

(A) identify the location of the best half-pixel accurate motion vector as location X, identify the pixel locations adjacent location X as 1, 2, . . . 8, as shown in the following diagram

| 1 | 2 | 3 |
|---|---|---|
| 4 | X | 5 |
| 6 | 7 | 8 |

(B) If the minimum SAD value among locations X, 2, 4, 5, and 7=the minimum SAD at X, THEN do not apply quarter pixel motion estimation;
ELSE IF the minimum SAD among locations X, 2, 4, 5, and 7=the minimum SAD at 2, THEN apply quarter-pixel motion estimation only at locations 1 and 3;
ELSE IF the minimum SAD among locations X, 2, 4, 5, and 7=the minimum SAD at 4, THEN apply quarter-pixel motion estimation only at locations 1 and 6;
ELSE IF the minimum SAD among locations X, 2, 4, 5, and 7=the minimum SAD at 5, THEN apply quarter-pixel motion estimation only at locations 3 and 8;
ELSE IF the minimum SAD among locations X, 2, 4, 5, and 7=the minimum SAD at 7, THEN apply quarter-pixel motion estimation only at locations 6 and 8.

10. A method of selecting an inter mode for encoding a video macroblock, the method comprising the following steps:
(a) defining a plurality of inter modes, each having a different length and width integer pixel count;
(b) dividing said plurality of inter modes into first, second and third sets of inter modes, with no set sharing an inter mode in common;
(c) obtaining a measure of the of the spatial variance of the largest among said plurality of inter modes relative to a (0,0) motion vector;
(d) defining a first spatial variance threshold, a second spatial variance threshold higher than said first spatial variance threshold, and a third spatial variance threshold higher than said second spatial variance threshold;
(e) IF said measure is smaller than said first spatial variance threshold, THEN excluding all of said inter modes from further processing in the encoding of said video macroblock;
(f) IF said measure is not smaller than said first spatial variance threshold and is smaller than said second spatial variance threshold, THEN applying motion estimation and rate-distortion computation to a skip mode and to said first set of inter modes, and excluding all remaining inter modes from further processing in the encoding of said video macroblock;
(g) IF said measure is not smaller than said second spatial variance threshold and is smaller than said third spatial variance threshold, THEN applying motion estimation and rate-distortion computation to said skip mode and to said first and second sets of inter modes, and excluding all remaining inter modes from further processing in the encoding of said video macroblock;
(h) IF said measure is not smaller than said third spatial variance threshold, THEN applying motion estimation and rate-distortion computation to said skip mode and to said first, second and third sets of inter modes;
(i) IF said measure is not lower than said first threshold, then selecting the best inter mode based on the rate-distortion computations, ELSE selecting said skip mode.

* * * * *